United States Patent [19]
Friel et al.

[11] 3,790,786
[45] Feb. 5, 1974

[54] PROCESS AND DEVICE FOR DETERMINING RADIOACTIVE ISOTOPES

[75] Inventors: Hanns-Immo Friel, Erlangen; Rudolf Prag, Marloffstein; Heidi Schlichting, Erlangen, all of Germany

[73] Assignee: Siemens Aktiengesellschaft, Erlangen, Germany

[22] Filed: Mar. 8, 1972

[21] Appl. No.: 232,868

[30] Foreign Application Priority Data
Apr. 10, 1971 Germany .................. P 21 17 698.7

[52] U.S. Cl. ......................... 250/71.5 S, 250/71.5 R
[51] Int. Cl. ............................................. G01t 1/20
[58] Field of Search .................... 250/71.5 S, 71.5 R

[56] References Cited
UNITED STATES PATENTS
3,509,341  4/1970  Hindel et al. .................... 250/71.5 S
3,591,806  7/1971  Brill et al. ....................... 250/71.5 S

*Primary Examiner*—Archie R. Borchelt
*Attorney, Agent, or Firm*—Richards & Geier

[57] ABSTRACT

Process and device for ray diagnosis are used to determine the distribution of radioactive isotopes located in a body by a line by line feeling of a measured surface through which the rays pass. The feeling takes place by means of a measuring probe which changes the intensity distribution into a sequence of impulses which are summed up one after the other through adjustable partial lengths of image rows in an integration counter combined with an inscribing device operated by the sums of impulses to provide an image reproducing the intensity distribution. The invention is particularly characterized in that the sums of impulses are fed to corresponding sections of storing elements and are transmitted for operating the inscribing device at the earliest during the feeling of the next image line.

5 Claims, 4 Drawing Figures

PROCESS AND DEVICE FOR DETERMINING RADIOACTIVE ISOTOPES

This invention relates to a process and device for ray diagnosis, namely, for determining the distribution of radioactive isotopes located in a body by feeling line by line by a measuring probe a measured surface through which the rays pass. The probe changes the distributed intensity into a sequence of impulses which are summed up one after the other through adjustable partial lengths of image rows in an integration counter. An inscribing device combined with the integration counter is operated by the sums of impulses to provide an image reproducing the intensity distribution. Such devices, which are also known as scanners, are used particularly in medical diagnosis to provide images available on paper, of radioactive substances which have been brought into a body and which, for example, have been so chosen that by selective accumulation they indicate the change of an organ caused by sickness.

Variable images showing the distribution of radioactive substances in a body can be produced in different ways. At the present time usually feeler devices are used which receive signals continuously line by line and transmit them to an average value measuring device. This device changes the arriving impulse rate into a measured value which operates, for example, a printing device, a photoprinter or an image producer. In this manner images are produced the intensity of blackness of which depends upon the intensity of the ray transmission, linearly or not linearly depending upon the type of image which it is desired to produce.

According to another process the measured value can be adapted by digital reduction to the printing device to such an extent that the printing device can produce a useable picture. However, it is also possible to produce the operating values in such manner that the impulse rate measured by a detector is collected in a counter after it has passed through a so-called impulse amount analyser during an adjustable time period which corresponds to a predetermined measuring or integration stretch. At the end of the integration stretch the contents of the counter are transformed by the printing device into a black image which corresponds to it. When using this process it is advantageous to adapt the integration stretch to the specific use. This provides the possibility of producing statistically better and clearer pictures which are medically clearer pictures better corresponding to circumstances.

The last-mentioned process has the drawback in common with analogous middle value measurers, that when high time constants or great integration lengths are used, the measured value capable of being represented, can appear only after the end of the time constant or after completion of the passage of the integration stretch. This produces an image wherein the distribution of the radioactive rays passing through the measured surface is represented as being shifted to the extent of an integration stretch in the direction of movement of the measuring device (scanner). This is particularly detrimental in case of a shiftable feeling usual in isotope diagnosis wherein a line passed in the forward movement, as well as a line passed in the rearward movement, are used for measurement. This would result for each line as a shifting to the extent of an integration stretch and in connection with opposed lines to a shifting amounting to a double length. In known devices attempts were made to avoid this so-called image line packing. The following was used:

1. Selection of sufficiently small integration stretches, so that the packing effect which always takes place is so small that it has no detrimental effects. This means, however, that integration stretches must be very short; the use of longer integration stretches which may be required, for example, due to bad statistics, is prevented. In most cases this prevents the selection of integration stretches which are best for image transmission.

2. Measurement of the distributed rays only to the extent of one measuring direction and return movement without measuring. The image which is thus produced is measured and written only along one side; in this image there is the same shifting according to size and direction so that no packing effect is visible. However, the duration of measurement is extended by the necessary empty return movement of the measuring probe and the writing device.

3. Mechanical balancing of the packing effect by shifting the printing system relatively to the measuring system. The size of the mechanical shifting must be then always adapted to the selected integration stretch. However, then there is a large electromechanical expenditure since on the one hand for each integration stretch there is a shifting for a different amount and on the other hand, in each line the direction of reproduction is changed.

An object of the present invention is to eliminate these drawbacks.

Other objects will become apparent in the course of the following specification.

In the accomplishment of the objectives of the present invention it was found possible to eliminate the above-stated drawbacks of the described ray diagnosis process and to produce an image free from the packing effect by feeding the impulse sums produced from the individual integration stretches into corresponding sections of a storing line; their further transmission to operate an inscribing device takes place only after the line has been completely felt. Thus the representation of each image line takes place at the earliest when the measuring probe is already feeling the following line. Then the measured value which is to be reproduced is available at each desired printing line already at the beginning of the integration stretch, so that it can be immediately printed. Thus despite the shifting measuring and feeling movement an image is written which is free of the packing effect in the line direction. However, there is a shifting of the image perpendicularly to the line direction, namely, to the extent of one line; however, this does not result in any drawbacks since the image itself is not affected. The integration stretch can be chosen freely and the retained shifting feeling movement guarantees the best possible utilization of the measuring time.

The process of the present invention is based on the feature that the measured value produced at the end of an integration stretch by counting the individual impulses during the movement through this stretch, is preserved in a storer while the section continues to run. During the return movement, namely, during the movement through stretches equal in the line direction, the next line is inscribed, in that the storer is completely inscribed from front to back and is read in the next line in the opposite direction. However, reading and writing can follow each other in a very short time space, namely, the individual image point storer can be read at the beginning of the integration, so that at the end of the integration stretch it is already available for storing the collected measuring value.

The so far described process results in image points the size of which is given on the one hand by the width of the lines and on the other hand by the length of the integration stretch. When integration stretches are very large very raw and mostly disturbing image structures are produced. In known processes it was impossible to avoid this drawback within the framework of digital integration.

Processes are known, however, wherein an analog middle value measurer is divided into several middle value measurers which integrate over a certain time the measured impulse rate and are then operated one after the other to produce a measured value, whereupon they are set back to zero as the measured value. The measuring time or the integration time is then determined by RC members and is independant from the extent of measuring speed or feeling speed. When the feeling speed is changed the integration stretch is therefore changed, although its size is not always known. However, it is important to know this stretch in order to balance the packing effect. On the other hand, in case of digital integration the integration stretch can be made independant from the feeling speed, i.e., from the speed of the measuring probe, since the integration time can be set at will, also depending upon the passed measured stretch.

According to a further improvement of the present invention the raw structure which occurs in digital integration and large integration stretches, can be avoided by using several counters during measuring to provide several measured values over integration stretches which are shifted in space and overlap each other. These measured values can be inscribed separately or after the formation of a middle value in correspondingly spaced sections of the storer line. When there is an uneven number of counters the measured value can be always advantageously placed in the middle of the integration stretch. Then the counters can be always examined in a fixed always repeating row sequence. This has the advantage that the operation of the program continuity is greatly simplified. Contrary to the prior art processes, the lines of the image consist then of several individual image points of smaller dimensions when there is the same selection of the integration stretch. A disturbing raw structure of the image can be avoided for large integration stretches as well, since the image points lie closer to each other. On the other hand, as compared to prior art processes the integration stretches can be considerably increased, which results in that a very good static smoothing is attained without the use of disturbing raw structure when this is permitted by the measuring requirements.

The process of the present invention is also advantageous when two measured values produced by two different detectors from the same or different objects are to be combined with each other mathematically or logically and inscribed. This is also the case when measured values obtained in a detector by means of two energetically different isotopes are normalized, numerically subtracted from each other and simultaneously inscribed. Namely, in a process of this type it is possible to avoid differences in measured values which would be disturbing and which are based on the packing effect. Only combined results, for example, differential results of measured values of corresponding locations are obtained.

The invention will appear more clearly from the following detailed description when taken in connection with the accompanying drawing showing by way of example only, preferred embodiments of the inventive idea.

Figure 1:
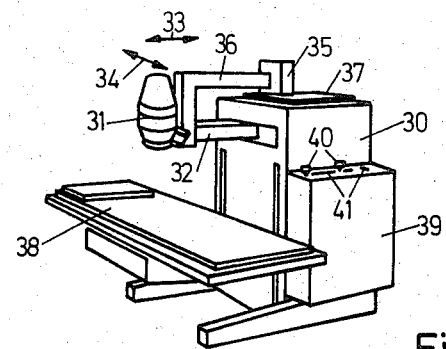
FIG. 1 is a perspective view of a feeler device constructed in accordance with the present invention.

The drawing illustrates embodiments of a diagnosis device of the present invention with sliding digital integration, electronic packing balancing and a calculating device.

FIG. 1 shows a box 30 which can be considered the basic unit of the feeling device. This box contains driving devices for the measuring head 31 which are known in prior art and, therefore, not illustrated. The measuring head 31 can be actuated by a beam 32 to carry out a feeler movement in the direction of double arrows 33 and 34. In the illustrated device a signal received in the measuring head 31 by the probe located therein is transmitted into the writing head 35 which is firmly connected by the arm 36 with the probe 32, so that it is synchronously reproduced upon the writing surface 37. The measuring head is located above the patient carrier 38 which can be adjusted as to height and can be moved longitudinally in the direction of the double arrow 34. The main electronic switching parts are located in the side box 39 the upper surface of which carries setting switches 40 and scales 41.

Figure 2:
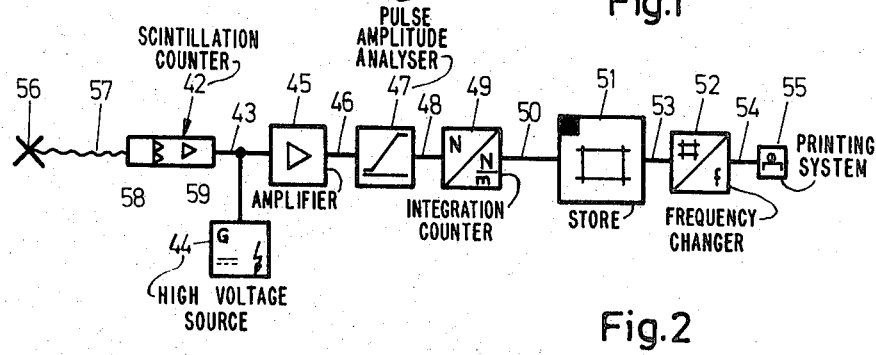
FIG. 2 is a block diagram illustrating diagrammatically the operation of the device.

FIG. 2 shows a scintillation counter 42 serving as the measuring probe and located in the measuring head 31. The counter 42 is connected by a line 43 on the one hand with a high voltage source 44 necessary to operate it and on the other hand with an amplifier 45. A line 46 leads from the amplifier 45 to provide a connection to an impulse strength analyser 47 which has a line 48 to a reducer and integration counter 49. The counter 49 has a connection 50 to the storer 51 which is connected by a line 53 to the measured value frequency changer 52. The frequency changer 52 has a line 54 to the reproducing unit, namely, to the writing and printing system 55 located in the writing head 35. The stylus of the system 55 constitutes the actual writing implement which is moved in a known manner and with the use of a colored sheet strikes an inscribing sheet which is located upon the surface 37 (FIG. 1) and is not shown in the drawing.

During the measuring when the patient lies upon the support 38 rays pass through his organ indicated symbolically by a cross 56 in FIG. 2. The rays shown by a wavy line 57 are changed in the crystal 58 of the counter 42 into light strokes which are changed in its magnifying stage 59 into electric impulses. These signals are amplified by the amplifier 45 and are selected in the impulse analyser 47 corresponding to the size expected from the inserted isotope so as to avoid action of extraneous interfering rays. In the counter 49 impulses measured over specific adjustable stretches passed by the measuring head 31, are summed up and are then fed into the locations of the line 61 of the storer 61 numbered 1 to 18 in FIG. 3 and into the sections of the second line numbered 19 to 27 in the direction of the arrow 60.

The reading takes place as indicated in the line 62 in the direction of the arrow 63 from the storer location 27. The line 62 is shown as hatched only for the sake of description and is not necessary for the function of the device. Simultaneously with the reading takes place a new insertion corresponding to storer locations indicated in the line 61 as 1' to 9'. The inscription corresponding to the location of the counter 42 and reproduction corresponding to the location of the printing system 55 take place relatively to the ine 61 at the location of the broken line designated as A. Consequently only one line 61 is required for receiving and reproduction.

Figure 3:
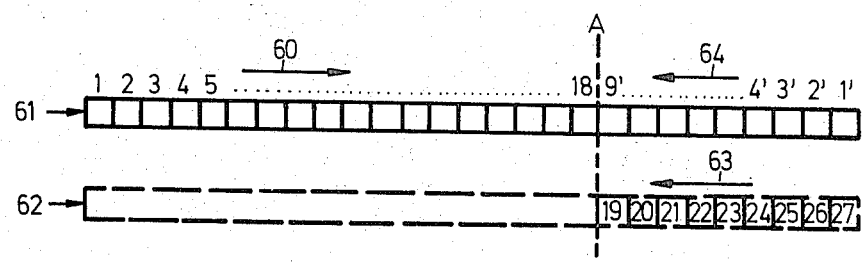
FIG. 3 is a diagram showing the reading system of the storer.
Figure 4:
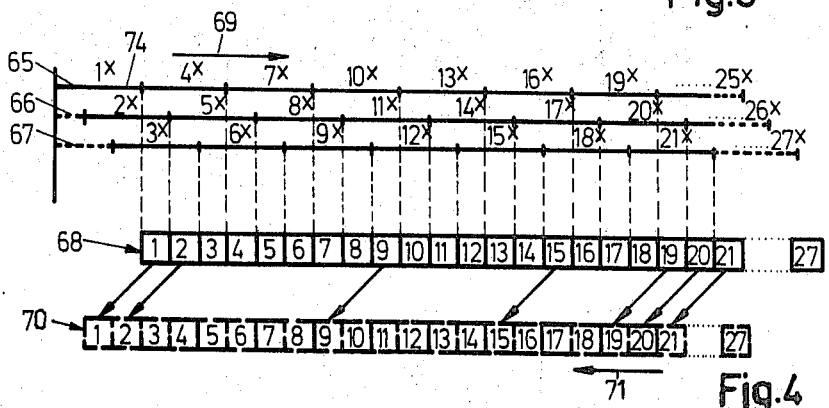
FIG. 4 is a diagram illustrating the use of several superposed integration stretches.

FIG. 4 shows a feeling stretch in the shape of three lines 65, 66 and 67 located one above the other. Each of them has a scale. The second scale is shifted to the extent of one third division of the integration stretches $1^x$ to $27^x$ while the third scale is relatively shifted to a further third division of the stretches $1^x$ to $27^x$. Three divisions 65 to 67 are provided since then the measured value can be always located in the middle of the corresponding stretches $1^x$ to $27^x$. For that purpose it is necessary that the storer 68 should have a number of locations which corresponds to the number of integration stretches. Only then there is a sufficient number of feeler places to be able to feed one next to the other the individual or average values of impulse sums appearing over the corresponding integration stretches. Reception takes place in the direction of the arrow 69 and in each location of the storer line 68 can be read after the end of corresponding integration stretch either the impulse sum which ran into it or an average value of the impulse sums which ran up to them over the three integration stretches 65, 66, 67. The summing up of the impulses takes place in an integration counter, in this case in three counters, whereby the counting takes place as in the counter 49 (FIG. 2). A continuous measuring result is received in the storer line 68, as in line 61 (FIG. 3). The reading takes place by shifting the line 68 into the place of the line 62 illustrated only for demonstration so that each feeding location is always arranged in the middle of the corresponding integration stretches $1^x$ to $27^x$. The reading direction corresponds to the arrow 71.

Although it is sufficient for the purposes of the present invention to provide a single storer line 61 or 68, it may be advantageous to have several such lines. Thus, by way of example, after storing four feeler lines, a so-called balancing calculation can be carried out to provide smooth images. Then, as is known, an averaging of adjacent image points from several image lines which follow each other, is carried out. This usually takes place over five elements (four arranged symmetrically around one element), or nine elements (eight arranged around one element, namely, three rows each of three elements), whereby the used elements are correspondingly examined. It is particularly advantageous to operate the writing and reading procedures of the last-mentioned arrangement by using the known program actuation.

What is claimed is:

1. A process for determining radioactive isotopes located in a body, comprising the steps of probe feeling line by line a surface through which rays pass, changing the intensity distribution into a sequence of impulses, summing up these impulses through adjustable partial stretches of image lines one after the other, feeding the impulse sums into corresponding locations of a storer line, transmitting said impulse sums at the earliest during the feeling of the next image line, and using these transmitted impulse sums for image reproduction of intensity distribution.

2. An X-ray diagnosing device for determining the distribution of radio active isotopes in a body by line by line probe feeling of a surface through which the radio active rays penetrate, the device comprising a measuring probe for changing the radio active rays into a series of impulses, an integration counter for summing up in sequence such impulses which correspond to the adjustable partial stretches of image rows, an image reproducing unit, and a storer between said integration counter and said image reproducing unit, said image reproducing unit being actuated by said integration counter and reproducing images corresponding to the intensity distribution, said storer storing the impulse sums of partial rows in corresponding locations of a storer line and transmitting them for operating the image reproducing unit at the earliest during the feeling of the next line by the measuring probe.

3. A device in accordance with claim 2, wherein said storer has a single storer line.

4. A device in accordance with claim 2, wherein the number of said integration counters is an uneven one.

5. A device in accordance with claim 2, wherein said storer has a number of locations, said number being divisible by the number of said counters.

* * * * *